(12) United States Patent  
Zhu

(10) Patent No.: US 9,405,342 B2  
(45) Date of Patent: Aug. 2, 2016

(54) SYSTEM AND METHOD FOR PROVIDING TIMING

(75) Inventor: Dao-Yi Zhu, Acton, MA (US)

(73) Assignee: Schneider Electric IT Corporation, Boston, MA (US)

(*) Notice: Subject to any disclaimer, the term of this patent is extended or adjusted under 35 U.S.C. 154(b) by 916 days.

(21) Appl. No.: 12/384,175

(22) Filed: Apr. 1, 2009

(65) Prior Publication Data

US 2010/0254228 A1    Oct. 7, 2010

(51) Int. Cl.
- G06F 1/04    (2006.01)
- G06F 1/26    (2006.01)
- G04G 5/00    (2013.01)

(52) U.S. Cl.
CPC . *G06F 1/263* (2013.01); *G04G 5/00* (2013.01)

(58) Field of Classification Search
CPC .............. G04F 1/00; G04G 5/00; G04G 5/02; G04G 5/002; G04T 5/00; G06F 1/263; G06F 15/7814; G06F 15/7817; H04M 1/122
USPC .............................................. 368/46–47, 28
See application file for complete search history.

(56) References Cited

U.S. PATENT DOCUMENTS

| | | | | |
|---|---|---|---|---|
| 4,761,644 A * | 8/1988 | Kawai | ............... | G07C 9/00182 307/10.2 |
| 5,438,681 A * | 8/1995 | Mensch, Jr. | ............... | G06F 1/08 716/110 |
| 5,481,507 A * | 1/1996 | Suzuki | ..................... | G04G 3/02 368/200 |
| 5,717,362 A * | 2/1998 | Maneatis et al. | ................. | 331/57 |
| 5,781,869 A * | 7/1998 | Parlett, Jr. | ............. | G01P 15/036 307/10.1 |
| 6,048,209 A * | 4/2000 | Bailey | ................... | G09B 23/281 434/238 |
| 6,141,774 A * | 10/2000 | Mattheis | ............. | G06F 11/0763 714/27 |
| 6,625,701 B1 * | 9/2003 | Arimilli et al. | ............... | 711/152 |
| 6,766,459 B2 * | 7/2004 | Shimura et al. | ............... | 713/320 |
| 7,171,542 B1 * | 1/2007 | Alfano | ...................... | G06F 1/08 710/317 |
| 7,251,256 B1 * | 7/2007 | Barry et al. | .................... | 370/503 |
| 8,553,503 B2 * | 10/2013 | Molchanov et al. | ......... | 368/120 |
| 2003/0085767 A1 * | 5/2003 | Nohara | ............... | H03M 1/0619 331/74 |

* cited by examiner

*Primary Examiner* — Sean Kayes  
(74) *Attorney, Agent, or Firm* — Hamilton, Brook, Smith & Reynolds, P.C.

(57) ABSTRACT

To overcome potential problems associated with overflowing counters/timers, embodiments of the present invention include a ping timer and a pong timer offset from each other, and a time checker that accesses at any one timer either the ping timer or the pong timer to determine whether a time interval has passed. Upon passage of the time interval, the time checker switches access from the ping timer to the pong timer before the ping timer reaches an overflow state, thereby avoiding problems associated with counter/timer overflow.

27 Claims, 10 Drawing Sheets

| Name | Value | Type | Radix |
|---|---|---|---|
| ◊ OnInvTimeOutCount | 7 | int16 | dec |
| ⊟ CheckTimerCapEE | {...} | CHECK_TIMER | hex |
| ⊟ ⇒ pTimer | 0x000088DD | RTC_REC* | hex |
| ◊ Hours | 0 | Uint16 | unsigned |
| ◊ Minutes | 29 | Uint16 | unsigned |
| ◊ Seconds | 1774 | Uint16 | unsigned |
| ◊ MSecs | 4622 | Uint16 | unsigned |
| ◊ EndTime | 1802 | Uint16 | unsigned |
| ◊ Interval | 34 | Uint16 | unsigned |
| ⊟ Flag | {...} | union FUNC_TIMFLG | hex |
| ◊ all | 1 | Uint16 | unsigned |
| ⊞ bit | {...} | struct FTmr_FLAGS | hex |
| ⊞ CheckTimerCal | {...} | CHECK_TIMER | hex |
| ⊟ CheckTimerCap | {...} | CHECK_TIMER | hex |
| ⊟ ⇒ pTimer | 0x000088DD | RTC_REC* | hex |
| ◊ Hours | 0 | Uint16 | unsigned |
| ◊ Minutes | 29 | Uint16 | unsigned |
| ◊ Seconds | 1774 | Uint16 | unsigned |
| ◊ MSecs | 4632 | Uint16 | unsigned |
| ◊ EndTime | 1775 | Uint16 | unsigned |
| ◊ Interval | 1 | Uint16 | unsigned |
| ⊞ Flag | {...} | union FUNC_TIMFLG | hex |
| ⊟ CheckTimerCharging | {...} | CHECK_TIMER | hex |
| ⊟ ⇒ pTimer | 0x000088DD | RTC_REC* | hex |
| ◊ Hours | 0 | Uint16 | unsigned |
| ◊ Minutes | 29 | Uint16 | unsigned |
| ◊ Seconds | 1774 | Uint16 | unsigned |
| ◊ MSecs | 4640 | Uint16 | unsigned |
| ◊ EndTime | 1825 | Uint16 | unsigned |
| ◊ Interval | 76 | Uint16 | unsigned |
| ⊞ Flag | {...} | union FUNC_TIMFLG | hex |
| ⊞ BattRegs | {...} | BATTERY_REGS_TYPE | hex |

FIG. 6A

| Name | Value | Type | Radix |
|---|---|---|---|
| ⊟ TransitionChecker | {...} | CHECK_TIMER | hex |
| ⊟ ⇒ pTimer | 0x000088D9 | RTC_REC* | hex |
| Hours | 32768 | Uint16 | unsigned |
| Minutes | 32809 | Uint16 | unsigned |
| Seconds | 35237 | Uint16 | unsigned |
| MSecs | 12342 | Uint16 | unsigned |
| EndTime | 11400 | Uint16 | unsigned |
| Interval | 500 | Uint16 | unsigned |
| ⊞ Flag | {...} | union FUNC_TIMFLG | hex |
| ⊟ NineMinsChecker | {...} | CHECK_TIMER | hex |
| ⊟ ⇒ pTimer | 0x000088D9 | RTC_REC* | hex |
| Hours | 32768 | Uint16 | unsigned |
| Minutes | 32809 | Uint16 | unsigned |
| Seconds | 35237 | Uint16 | unsigned |
| MSecs | 12352 | Uint16 | unsigned |
| EndTime | 32818 | Uint16 | unsigned |
| Interval | 9 | Uint16 | unsigned |
| ⊞ Flag | {...} | union FUNC_TIMFLG | hex |
| ⊟ TenSecsChecker | {...} | CHECK_TIMER | hex |
| ⊟ ⇒ pTimer | 0x000088D9 | RTC_REC* | hex |
| Hours | 32768 | Uint16 | unsigned |
| Minutes | 32809 | Uint16 | unsigned |
| Seconds | 35237 | Uint16 | unsigned |
| MSecs | 12364 | Uint16 | unsigned |
| EndTime | 35246 | Uint16 | unsigned |
| Interval | 10 | Uint16 | unsigned |
| ⊞ Flag | {...} | union FUNC_TIMFLG | hex |
| ⊟ FiveSecsChecker | {...} | CHECK_TIMER | hex |
| ⊟ ⇒ pTimer | 0x000088D9 | RTC_REC* | hex |

FIG. 6B

| Name | Value | Type | Radix |
|---|---|---|---|
| ⊟ ✦ TransitionChecker | {...} | CHECK_TIMER | hex |
| ⊟ ⇨ pTimer | 0x000088D9 | RTC_REC* | hex |
| ◆ Hours | 32768 | Uint16 | unsigned |
| ◆ Minutes | 32806 | Uint16 | unsigned |
| ◆ Seconds | 35060 | Uint16 | unsigned |
| ◆ MSecs | 31696 | Uint16 | unsigned |
| ◆ EndTime | 31010 | Uint16 | unsigned |
| ◆ Interval | 500 | Uint16 | unsigned |
| ⊞ ✦ Flag | {...} | union FUNC_TIMFLG | hex |
| ⊟ ✦ NineMinsChecker | {...} | CHECK_TIMER | hex |
| ⊟ ⇨ pTimer | 0x000088DD | RTC_REC* | hex |
| ◆ Hours | 0 | Uint16 | unsigned |
| ◆ Minutes | 38 | Uint16 | unsigned |
| ◆ Seconds | 2292 | Uint16 | unsigned |
| ◆ MSecs | 64477 | Uint16 | unsigned |
| ◆ EndTime | 47 | Uint16 | unsigned |
| ◆ Interval | 9 | Uint16 | unsigned |
| ⊞ ✦ Flag | {...} | union FUNC_TIMFLG | hex |
| ⊟ ✦ TenSecsChecker | {...} | CHECK_TIMER | hex |
| ⊟ ⇨ pTimer | 0x000088DD | RTC_REC* | hex |
| ◆ Hours | 0 | Uint16 | unsigned |
| ◆ Minutes | 38 | Uint16 | unsigned |
| ◆ Seconds | 2292 | Uint16 | unsigned |
| ◆ MSecs | 64489 | Uint16 | unsigned |
| ◆ EndTime | 2301 | Uint16 | unsigned |
| ◆ Interval | 10 | Uint16 | unsigned |
| ⊞ ✦ Flag | {...} | union FUNC_TIMFLG | hex |
| ⊟ ✦ FiveSecsChecker | {...} | CHECK_TIMER | hex |
| ⊟ ⇨ pTimer | 0x000088DD | RTC_REC* | hex |

FIG. 6C

SYSTEM AND METHOD FOR PROVIDING TIMING

BACKGROUND OF THE INVENTION

An uninterruptible power supply (UPS), also known as a continuous power supply (CPS) or battery backup, is a device that maintains a continuous supply of electric power to connected equipment, such as, for example, computers or telecommunications equipment, by supplying power from a separate source when a normal power source is not available. A UPS differs from an auxiliary power supply or standby generator, which does not provide instant protection from a momentary power interruption. A UPS can be used to provide uninterrupted power to equipment for a certain duration, for example, thirty minutes, until a generator can be turned on or until the normal power source is restored. Integrated systems that have UPS and standby generator components are often referred to as emergency power systems. There are different types of UPS systems. A UPS system may remain idle until a power failure occurs and then quickly switches from utility power to its own power source, or may continuously power the protected equipment from its energy reserves stored in a battery or flywheel while simultaneously replenishing its reserves from another power source. Most types of UPS systems use timers to regulate certain functionality. Such timers use system resources, and a large number of timers can greatly increase the overall cost of a system. This is also true for most embedded systems.

SUMMARY OF THE INVENTION

One embodiment of the present invention is a system for providing timing. The system includes a first timer (i.e., a ping timer) and a second timer (i.e., a pong timer), where the value of the pong timer is offset from the value of the ping timer. The system also includes a time checker that accesses the ping timer to determine whether a time interval has passed and, upon determining that the time interval has passed, switches access to the pong timer before the ping timer reaches an overflow state. As used herein, the generically phrased first and second timers are referred to as ping and pong timers, respectively, to distinguish between the two timers.

Another embodiment is a system for providing a timer. The system includes multiple processor-level memory locations storing a representation of time at a lowest level of time granularity and multiple other representations of time at respectively higher levels of time granularity, an update unit configured to update the representations of time on a regular basis at least as often as the lowest level of time granularity, and a data structure enabling access to the representations of time, where the data structure includes address information for the memory locations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 6A-C illustrate example values of variables that may be used to implement a ping-pong timer system.

DETAILED DESCRIPTION OF THE INVENTION

A description of example embodiments of the invention follows.

Figure 1A:
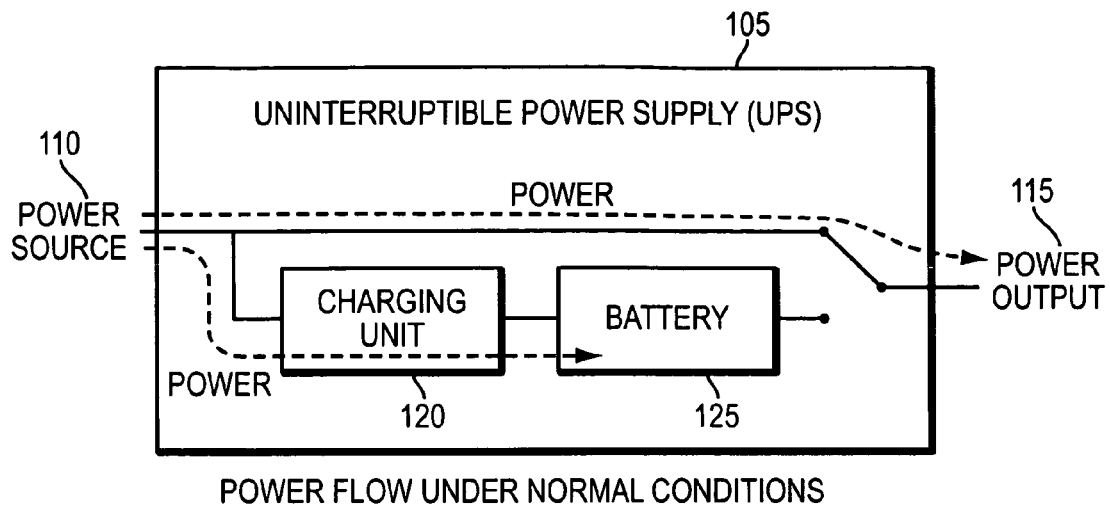
FIGS. 1A and 1B are schematic diagrams illustrating functionality of an Uninterruptible Power Supply (UPS).

FIG. 1A is a schematic diagram illustrating the power flow of an Uninterruptible Power Supply (UPS) 105 under normal conditions (i.e., without a power failure). Normally, the UPS 105 transfers power to a connected device (not shown) without using a battery 125 of the UPS 105 as a source of the power. More specifically, power is transferred from a power source 110, such as a municipal electricity supply, to the UPS 105, and the UPS 105 transfers the power to the connected device (not shown) via a power output 115. The UPS 105 may maintain a sufficient level of power in its battery 125 using a charging unit 120, which obtains power from the power source 110.

Figure 1B:
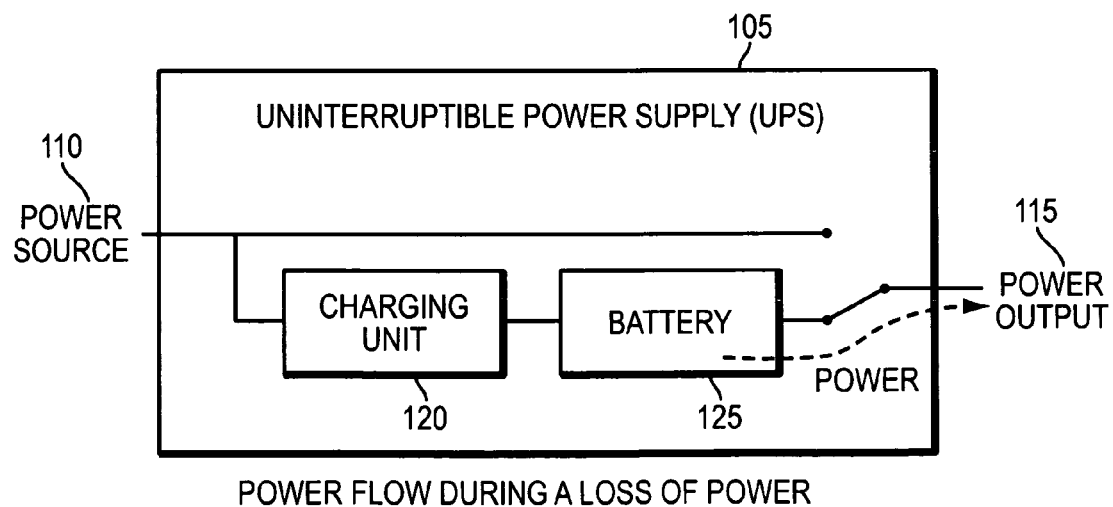

FIG. 1B is a schematic diagram illustrating the power flow of the UPS 105 during a loss of power from the source 110. In an event a power failure occurs with respect to the power source 110, the UPS 105 switches from supplying power to the connected device from the power source 110 to supplying power to the connected device from the battery 125. Once the power source's failure is corrected, the UPS 105 may then switch back to supplying power to the connected device from the power source 110 and may recharge the battery 125.

Many UPS systems are implemented as embedded systems, in which timers are used to regulate certain functionality for the UPS systems. Because the timers are implemented in embedded systems, the systems suffer when too much cycle time is used for timing control. Thus, a large amount of individual timers slow down the whole system. As timers are added in a typical system, there is an exponential increase in use of system resources. Additionally, adapting typical timing controls to different processors is tedious and prone to error.

Embodiments of the present invention solve these problems by limiting the number of timers to two physical timers; a ping timer and a pong timer. Using these two timers, many logical timers may be instantiated that access the ping and pong timers. This approach makes it easy to add or remove timers of a system, and improve the adaptability of timing control to different processors. The same logic can be used to achieve any level of timing precision, so long as the processor can handle that level of precision. In most embodiments, 16-bit variables may be used to handle any length of timing control, with only fixed switching time overhead. Further, as logical timers are added to the system, there is only a linear increase in use of system resources. The manner in which the logical timers (or "time checkers") use the ping and pong timers is described below.

Figure 2:
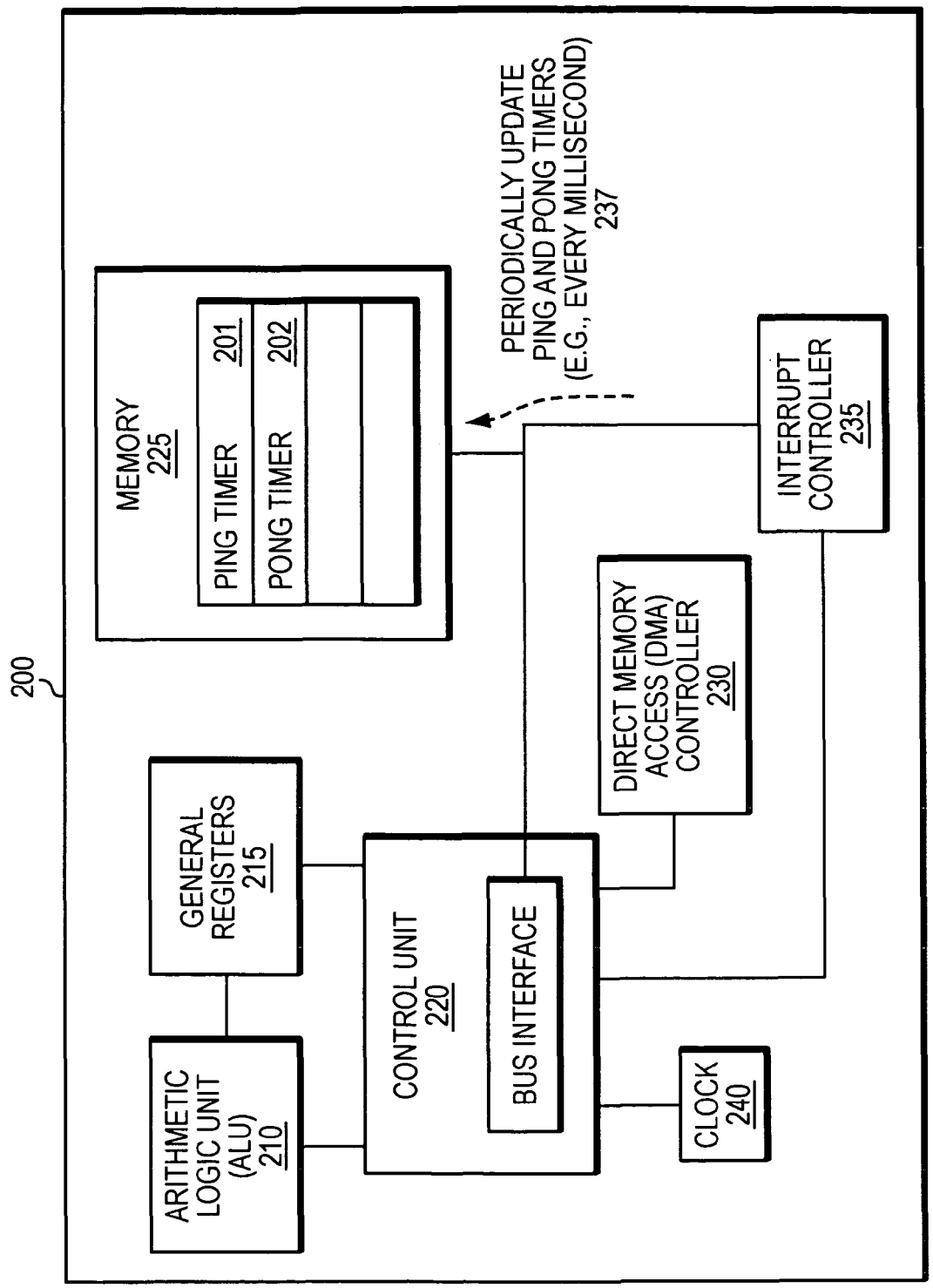
FIG. 2 is a block diagram illustrating a ping timer and a pong timer in the memory of a basic computer design.

FIG. 2 is a block diagram 205 illustrating a basic architecture of a processing device, according to an embodiment of the present invention. The diagram 205 is simple, but is representative of more advanced computing designs. Illustrated in the diagram 205 is a ping timer 201 and a pong timer 202 in the memory 225 of the basic computer design. Overall, the illustrated architecture includes an arithmetic logic unit (ALU) 210, registers 215, a control unit 220, memory 225, a direct memory access (DMA) controller 230, an interrupt controller 235, and a clock 240.

In steps timed by a signal from the clock 240, the control unit 220 repeats a cycle of fetching an instruction from memory 225 to be executed, decoding the instruction, executing the instruction, and storing the results of the instruction. The control unit uses the ALU 210 to execute arithmetic and logic instructions, stores information in the registers 215, and communicates with the rest of the architecture through a processor bus.

A DMA controller 230 may be used to transfer data to and from the memory. In that situation, the memory can be accessed directly by the DMA controller 230 and the control unit 220 is relinquished (reducing its overhead).

Interrupt is allowed by the control unit 220 for checking whether an interrupt signal is set before executing an instruction. An interrupt controller 235 may receive several interrupt requests, in which case the interrupt controller 235 aggregates the inputs along with information used to distinguish the interrupt requests. An interrupt handler, also known as an interrupt service routine (ISR), is a callback subroutine in an operating system or device driver for which execution is triggered by the reception of an interrupt. The handler is initiated by either hardware interrupts or interrupt instructions in software, and is used for servicing hardware devices and transitions between protected modes of operation, such as system calls. An interrupt service routine is used to determine precise timing increments at the level of granularity of a basic time unit (e.g. milliseconds). In the example embodiments, the ping and pong timers 201, 202 are updated 237 through the use of such interrupts.

Figure 3:
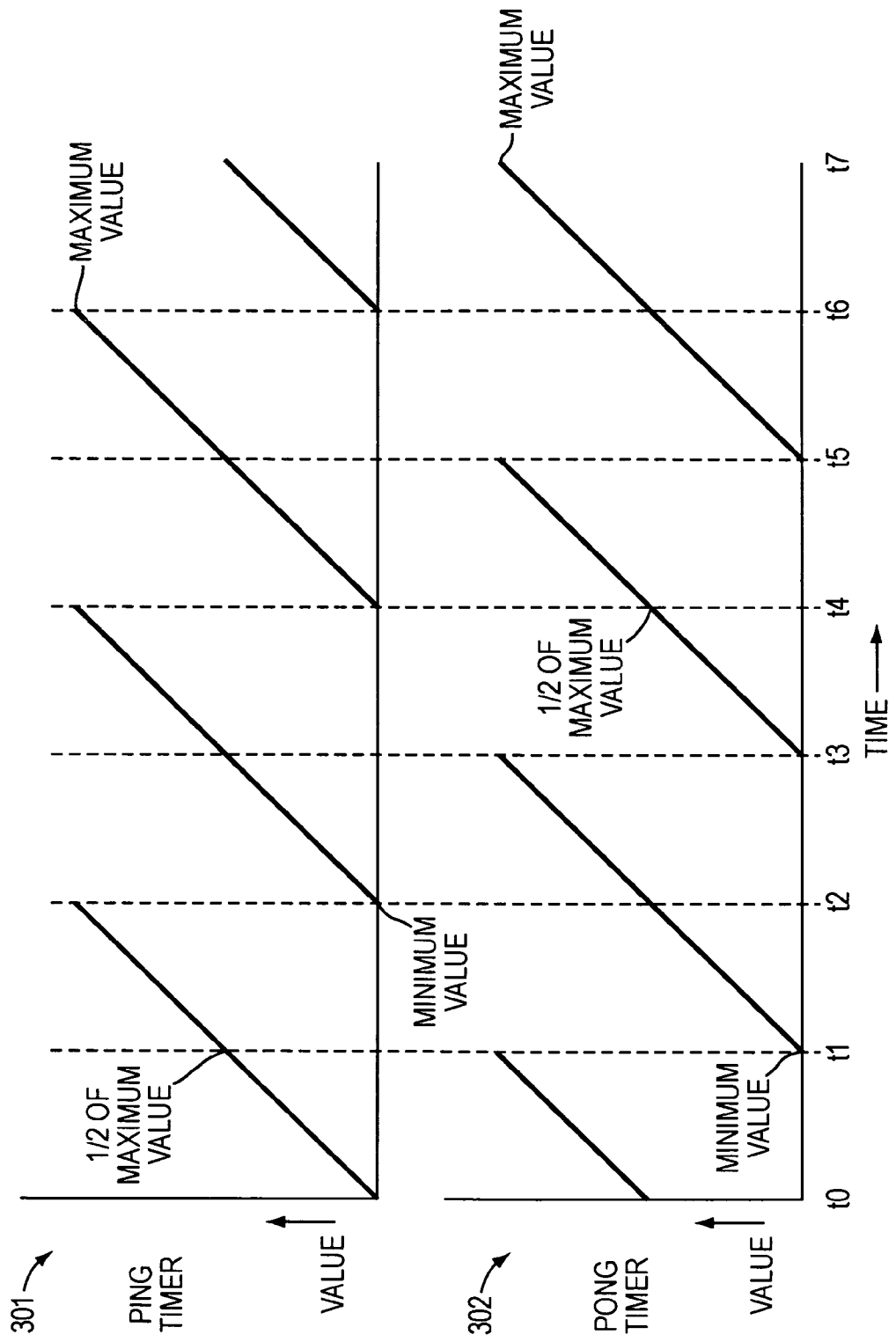
FIG. 3 is a graph illustrating changing values of a ping timer and a pong timer over time, and illustrating an offset between the ping and pong timers.

FIG. 3 is a graph illustrating the changing values of a both ping timer 301 and a pong timer 302 over time, and illustrating an offset between the ping and pong timers 301, 302, according to an embodiment of the present invention. Many timing systems include a counter that is used as a measure of time. Such a counter is allocated a certain number of bits (e.g., 128 bits). To save physical resources and associated costs, the number of bits may be reduced, for example, to 16 bits. One problem inherent in such counters as a result of the limitations of computer memory is that they are subject to overflowing; that is, a counter will reach a maximum value (such as 65,535 for a 16 bit counter-uint16 data type) and upon reaching that value will start over at 0. A graphical representation of this concept is illustrated in the top half of FIG. 3 (the ping timer 301). As time moves forward and a counter (ping timer) is incremented, the value of the ping timer 301 increases linearly. In FIG. 3, the value of the timer 301 is its minimum value (e.g., zero) at time t0 and the value is its maximum value (e.g., 65,535) at about time t2. As illustrated, once the timer 301 reaches its maximum value and is then incremented, the value of the timer 301 overflows to its minimum value.

Consider an example situation in which a timer having a maximum value of 65,535 is incremented once each second and is used to measure a time interval of five minutes (i.e., 300 seconds). If at the start of the 5-minute interval the value of the timer is 14,000, then the 5-minute interval is known to be complete when the timer has a value of 14,300. Thus, the end time of the interval is calculated by adding the interval to the initial value of the timer at the beginning of the interval. On the other hand, if the initial value of the timer at the start of the interval is 65,500, then the timer will reach an overflow state before the 5-minute interval is complete. This can cause an error when calculating the end time of the interval and may result in problems, such as, for example, an infinite time interval.

Embodiments of the present invention solve this problem by providing a system of timing that includes a ping timer 301 and a pong timer 302, which avoids errors with respect to timer overflow. An important aspect of such embodiments is that the value of the pong timer 302 is offset from the value of the ping timer 301. A time checker accesses the ping timer 301 to determine whether a time interval has passed, as described in the example above, but the time checker, upon determining that the time interval has passed, switches access to the pong timer 302 before the ping timer 301 reaches an overflow state.

As illustrated in FIG. 3, the value of the pong timer 302 may be offset from the ping timer 301 by half of the maximum value of the timers. This way, when one timer is near its overflow state, the other timer is relatively far from its overflow state. For example, the time checker may first point to the ping timer 301 and use the ping timer 301 to calculate a time interval. The time checker may continue to use the ping timer 301 between times t0 and t1 without danger of the ping timer overflowing, but once the ping timer 301 has a value of greater than half of its maximum value, the danger of overflow increases. Thus, after time t1 and at the end of an interval, the time checker switches to using the pong timer 302 for its calculations. As illustrated, the pong timer 302 is not near its overflow state between times t1 and t2, and the time checker may continue to use the pong timer 302 between times t1 and t2 without danger of the pong timer 301 overflowing. Similarly, after time t2, the time checker may switch back to using the ping timer 301 at the end of an interval. The time checker can continue to switch back and forth between the ping and pong timers 301, 302 in this manner to avoid timer overflow problems.

Accordingly, the ping timer and the pong timer may (i) each reach a maximum value before respectively reaching the overflow state, (ii) each reset to a minimum value upon respectively reaching the overflow state, and (iii) be offset from each other by one half of the maximum value. Further, the time checker may switch access to the pong timer upon determining that the time interval has passed and in an event the value of the ping timer exceeds one half of the maximum value, and may switch access from the pong timer back to the ping timer before the pong timer reaches the overflow state. In addition, the time checker may access the ping and pong timers using a pointer, a central controller may simultaneously update both the ping timer and the pong timer, and a separate module may use the time checker to determine whether the time interval has passed and then perform a subsequent action based on the determination.

The ping timer and the pong timer can each include multiple representations of time at multiple levels of time granularity, and the multiple representations of time may be updated during an interrupt service routine. It should be appreciated that a plurality of time checkers may independently access the ping and pong timers to determine whether time intervals have passed. It should also be appreciated that the system may include at least one additional timer, and that each respective value of the additional timers is offset from the values of the ping timer, the pong timer, and any other of the timers. In such a system, the time checker may rotates through all of the timers by (i) switching access from the pong timer to a first of the additional timers before the pong timer reaches the overflow state and (ii) switching access from a last of the additional timers back to the ping timer before the last timer reaches the overflow state.

Another embodiment may be an associated method of providing timing by updating a ping time and a pong time, where the pong time is offset from the ping time, accessing the ping time to determine whether a time interval has passed, and, upon determining that the time interval has passed, switching access to the pong time before the ping time overflows.

Another embodiment may be a computer readable medium having computer readable program codes embodied therein for providing timing. The computer readable program codes include instructions that, when executed by a processor, cause the processor to allocate memory for a ping timer, allocate memory for a pong timer, where the value of the pong timer being offset from the value of the ping timer, access the ping timer to determine whether a time interval has passed, and, upon determining that the time interval has passed, switch access to the pong timer before the ping timer reaches an overflow state.

Yet another embodiment may be an uninterruptible power supply (UPS) system that includes a battery, a ping timer, and a pong timer, where the value of the pong timer is offset from the value of the ping timer. As in the other example embodiments, the example UPS system includes a time checker that accesses the ping timer to determine whether a time interval has passed and, upon determining that the time interval has passed, the time checker switches access to the pong timer before the ping timer reaches an overflow state. Additionally, the UPS system includes a charging module that is configured to store power in the battery from an external power source based on the time interval(s) determined by the time checker.

Other embodiments may include systems for providing a timer. Such embodiments include multiple processor-level memory locations storing a representation of time at a lowest level of time granularity and multiple other representations of time at respectively higher levels of time granularity, an update unit configured to update the representations of time on a regular basis at least as often as the lowest level of time granularity, and a data structure enabling access to the representations of time, where the data structure includes address information for the memory locations. Such embodiments may include levels of time granularity that relate to calendar units.

Other embodiments may include associated methods of providing a timer. Such methods include allocating multiple processor-level memory locations to store a representation of time at a lowest level of time granularity and multiple other representations of time at respectively higher levels of time granularity, updating the representations of time on a regular basis at least as often as the lowest level of time granularity, and enabling access to the representations of time through a data structure that includes address information for the memory locations. As in the systems for providing a timer, the methods may include levels of time granularity relating to calendar units.

Figure 4A:
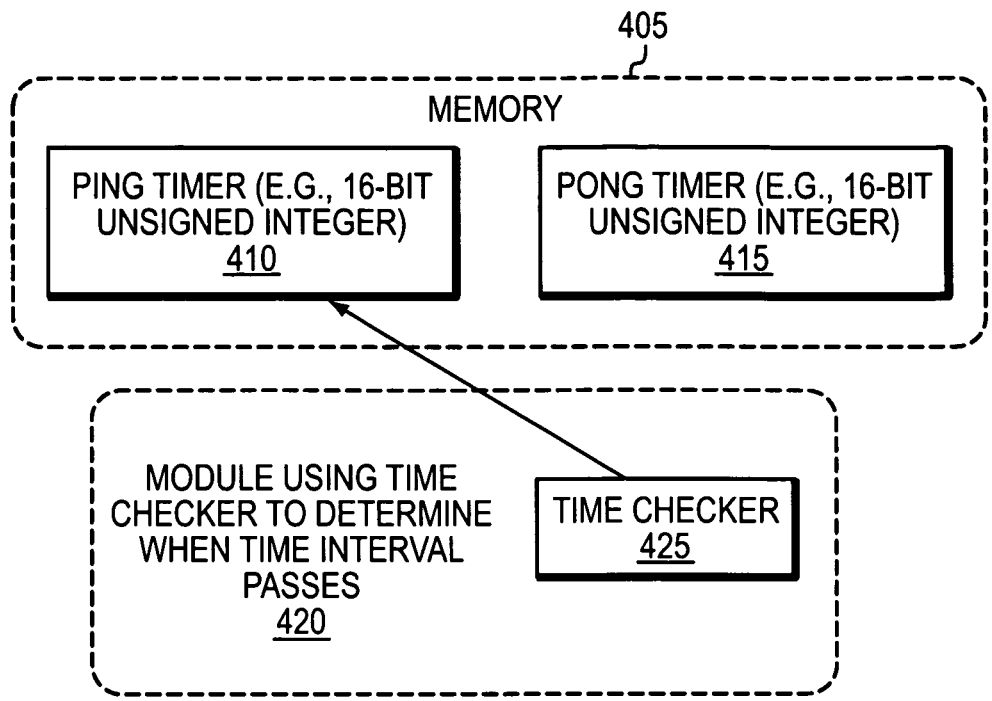
FIGS. 4A and 4B are schematic diagrams illustrating a ping timer, a pong timer, and a time checker that access the ping and pong timers.
Figure 4B:
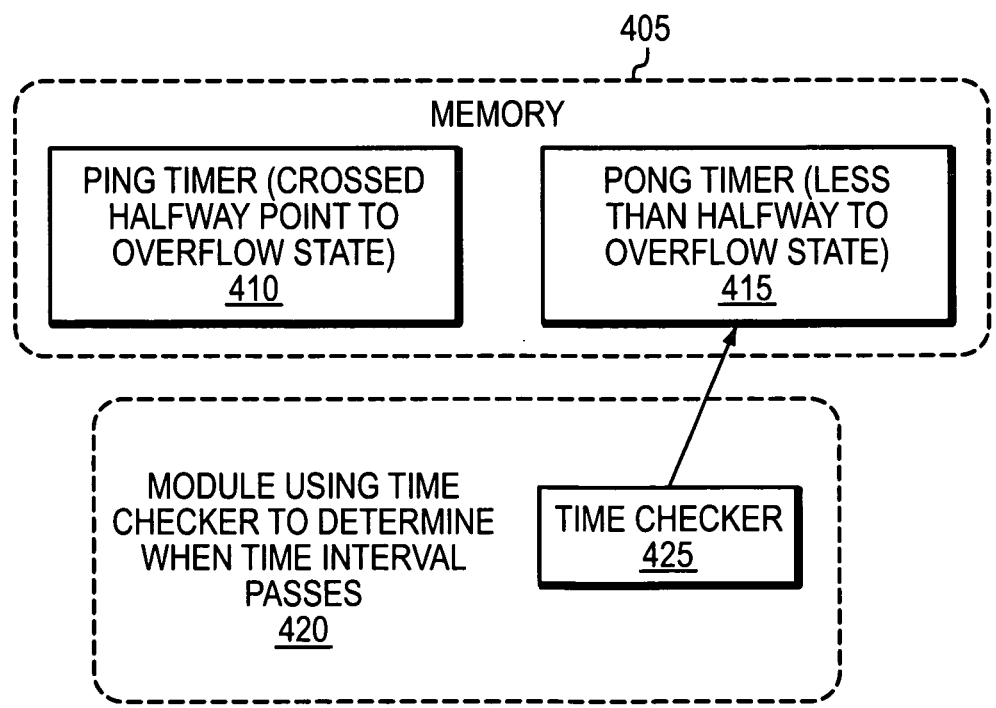

FIGS. 4A and 4B are schematic diagrams illustrating the ping timer 410, the pong timer 415, and the time checker 425 that access the ping and pong timers 410, 415, according to an embodiment of the present invention. As described above, the ping timer 410 and the pong timer 415 reside in memory and may be, for example, 16-bit unsigned integers (unit16). A separate module uses a time checker 425 to access the ping and pong timers 410, 415. The time checker 425 may be a part of the module 420 or may be separate from the module 420. FIG. 4A shows that the time checker 425 initially may point to and access the ping timer 410. FIG. 4B shows that the time checker 425 may switch to and access the pong timer 415 when the ping timer 410 crosses the halfway point to its overflow state.

Figure 5:
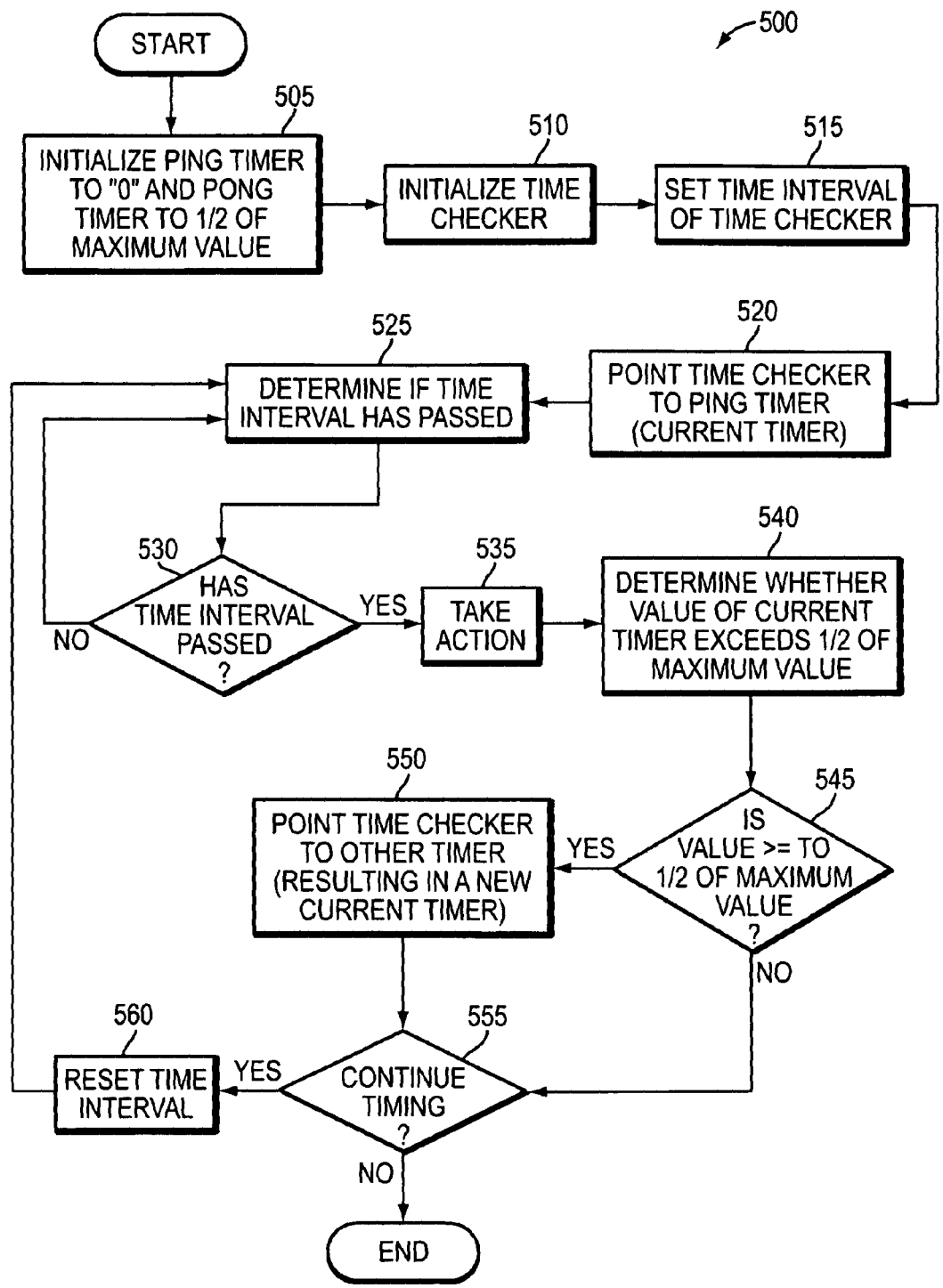
FIG. 5 is a flow diagram illustrating using a ping timer, a pong timer, and a time checker to provide timing.

FIG. 5 is a flow diagram 500 illustrating using a ping timer, a pong timer, and a time checker to provide timing, according to an embodiment of the present invention. Before a time checker access the ping and pong timers, the ping timer is set to a value of zero and the pong timer is set to a value equal to half of the maximum value of the timers (505). For example, if the maximum value of the timers is 65,535, then the ping timer is set to 0, and the pong timer is set to 32767. The time checker may then be initialized by, for example, instantiating a time checker object that is used to track time intervals in minutes (510). To measure a given time interval, the time checker is then configured with the given interval of time (e.g., 5 minutes). The time checker is then set to initially point to the ping timer and an end time is determined from the value of the ping timer for when the interval will have passed (520). The end time may be calculated by adding the given time interval to the current value of the ping timer, as described above. At a regular rate, the time checker then determined whether the time interval has passed by comparing the calculated end time with the value of the ping timer (525, 530). If the time interval has not passed, then the time checker checks the ping timer again after the ping timer is updated.

On the other hand, if the time interval has passed, a related action may be taken (535). Before calculating a new end time for the next interval, the time checker determines whether the value of the ping timer exceeds half of the maximum value of the timers (540, 545). If the values does not exceed half of the maximum value, then the time check remain pointing to and accessing the ping timer, and the new end time is based on the value of the ping timer (555, 560). But if the values does exceed half of the maximum value, then the time checker is set to point to the pong timer and the new end time is based on the value of the pong timer (550, 555, 560). As described above, the switching of the time checker back and forth between the ping and pong timers avoids problems associated with timer overflow.

The following provides further guidance on how to make and use the ping-pong timing systems and methods in an efficient manner.

Example Data Structures Used to Implement the Ping-Pong Timers

The following are example data structures that may be used to implement a ping-pong timer system. The example data structures are represented in the C programming language, but any appropriate programming language may be used.

```
enum {
    HOURS_LOC,
    MINUTES_LOC,
    SECONDS_LOC,
    MSECONDS_LOC
};
struct RTCRECORD {
    Uint16      Hours;      // hours accumulation
    Uint16      Minutes;    // minutes accumulation
    Uint16      Seconds;    // seconds accumulation
    Uint16      MSecs;      // milliseconds accumulation
};
typedef struct RTCRECORD RTC_REC;
struct SYSYTEM_TIMERS {
    RTC_REC     Ping;       // Ping rtc timer
    RTC_REC     Pong;       // Pong rtc timer
    Uint16      Hr;         // local hours
    Uint16      Min;        // local minutes
    Uint16      Sec;        // local seconds
    Uint16      Msec;       // local milliseconds
```

-continued

```
        Uint16      Adjust;    // adjust time lost.
                               // Not needed if precise
                               // timing can be achieved
        Uint16      p5mSec;
};
typedef struct SYSYTEM_TIMERS SYSTIMER;
extern SYSTIMER SysTime;
struct CALENDAR_RECORD {
        Uint16      YY;        // year
        Uint16      MM;        // month
        Uint16      DD;        // date
};
typedef struct CALENDAR_RECORD          CAL_REC;
extern CAL_REC CalRec;
extern CAL_REC LocalCalRec;    // Local Calendar
                               // memory location
struct _Tmr_FLAGS {
        Uint16 TOFlag    : 1;  // bit0 - Cycle Counter Flag
        Uint16 State     : 1;  // bit1 - timer idle(0)
                               // or active(1)
        Uint16 Slice     : 6;  // bits[2:7] - can handle
                               // up to 64 slices
        Uint16 TmrIdx    : 2;  // 0-hours; 1-minutes;
                               // 2-seconds; 3-mSec
};
union TMR_FLGS {
        Uint16              all;
        struct _Tmr_FLAGS   bit;
};
struct _CHECK_TIMER {
        RTC_REC     *pTimer;   // timer pointer
        Uint16      EndTime;   // Endtime
        Uint16      Interval;  // Msecs, Seconds, Minutes,
                               // Hours...
        union TMR_FLGS Flag;
};
typedef volatile struct _CHECK_TIMER CHECK_TIMER;
```

Example Time-Out Routine Used to Check for a Time-Checker's Time-Out Condition and to Handle Ping-Pong Switching

```
//-------------------------------------------------
//
//   Tmr_TimeOut ( ) -   common function to check
//                       time-out condition.
//
//   input:
//          CHECK_TIMER *pCheck -   points to timer check
//                                  structure
//          Uint16 idx -    type of the timer
//                          (ms, sec, min, or hour)
//
//-------------------------------------------------
//
BOOLEAN Tmr_TimeOut (CHECK_TIMER *pCheck, Uint16 idx)
{
    Uint16              *pCurTime;
    CHECK_TIMER         *pCurCheck;
    pCurCheck = pCheck;
    pCurTime = (Uint16 *)pCurCheck->pTimer + idx;
    if (*pCurTime >= pCurCheck->EndTime)
    {
        // TOFlag means TimeOutFlag
        pCurCheck->Flag.bit.TOFlag = TRUE;
        if (ValTheBit(*pCurTime, BIT15))
        {
            // At this point, it is known that the
            //current pTimerGroup->pTimer's
            // curTime is greater than the turning
            // point, so it is needed to switch to
            // the other timer (Ping or Pong).
            pCurCheck->pTimer = Tmr_SelectPingPong
                             (pCurCheck->pTimer );
            pCurTime = (Uint16 *)pCurCheck->pTimer
                             + idx;
        }
        pCurCheck->EndTime =
                pCurCheck->Interval + *pCurTime;
        return (TRUE);
    }
    return (FALSE);
}
```

The following examples focus on how to set up the ping-pong timing control system in order to achieve a high level of performance depending on the particular application of the ping-pong timer.

EXAMPLE 1

Set-Up and Update Group Timers

If milliseconds cycle timers are to be used, the two functions for milliseconds cycle timers update should be put in a main loop so that the time-out condition can be updated accordingly, for example, every two milliseconds. The same logic applies to other types of timers, for example, seconds cycle timers. Because every individual "time slice" would be called about 32 ms, the two functions for seconds cycle timers update need only be called in one time slice rather than being called every time slice, thereby greatly reducing the number of instruction cycles used for timing control.

```
Main ( )
{
    ...
    while (1)
    {
        ...
        switch (timeSlice)
        {
            case 1:
                ...
                break;
            ...
            case 14:
                ...
                break;
            case 15:
                ...
                Tmr_CycleSecondTimeOutUpdate( );
                break;
        }
        ...
        TicService( );
        Tmr_CycleMsTimeOutUpdate( );
    }
}
```

It should be noted that the time-out intervals for all of the seconds cycle timers are greater than or equal to one second. Thus, calling a time-out update function every 32 ms would satisfy the accuracy requirements for any seconds cycle timers. Compared to being called every 2 ms, being called every 32 ms takes only $1/15$ of the amount of time. This greatly reduces the instruction cycles needed for the timing control processes. This not only simplifies code management, but further reduces the total number of instructions for time-out condition checking.

It should also be noted that the time-out intervals for any milliseconds cycle timers are typically greater than two milliseconds. Thus, calling a time-out update function for any milliseconds cycle timers would still satisfy the accuracy requirements because the time slice for the above example main loop is about two milliseconds. This results in an overall improvement in system efficiency.

The following is an example of calling the above functions:

```
if (ValTheBit(State.Current, BIT1)) {
    if (Tmr_IsTimeOut
            (&SecTimersByMainLoop[TIMER_SYS_ONE_SEC])
            && (dcBusVoltage < DC_BUS_LO_THRESHOLD)){
        DC_TO_DC_ENABLE;
    }
    else if(dcBusVoltage > DC_BUS_HI_THRESHOLD) {
        DC_TO_DC_DISABLE;
    }
}
```

EXAMPLE 2

Local Timer Application

Way #1. Initialize once, free run forever timer.
Step 1: Initialize local timer.
For milliseconds timer:
Tmr_SetTimeOutMSeconds (&Local_msTimer, msInterval);
For Seconds timer:
Tmr_SetTimeOutSeconds (&Local_Timer, secondsInterval);
For Minutes timer:
Tmr_SetTimeOutMinutes (&Local_Timer, minutesInterval);
For Hours timer:
Tmr_SetTimeOutHours (&Local_Timer, hoursInterval);
. . . and so on . . .
Step 2: Use local timer to control timing.
For milliseconds timer:

```
if (Tmr_MSecondsTimeOut(&Local_msTimer)) {
    ... }
    For seconds timer:
if (Tmr_SecondsTimeOut(&Local_Timer)) {
    ... }
    For minutes timer:
if (Tmr_MinutesTimeOut(&Local_Timer)) {
    ... }
    For seconds timer:
if (Tmr_HoursTimeOut(& Local_Timer)) {
    ... }
    ... and so on ...
```

The only overhead that occurs is when the timing functions are being called. Way #1 is good for cases that do not need a timer to start at an absolute accurate point to control the timing because it takes much less instructions to do the timing control.

Example of using Way #1:

```
void Batt_LocalTimerInit (void)
{
    Batt_RegTimerInit(FIVE_SECONDS);
    Tmr_SetTimeOutMSeconds
        (BattRegs.CheckTimer100ms,
        HUNDRED_M_SECONDS);
    // The following timers need to be started
    // at a specific moment; therefore, set timer
    // flag to IDLE state.
```

```
    Tmr_IdleTheTimer(&BattRegs.CheckTimer);
    Tmr_IdleTheTimer(&BattRegs.LowBattTimer);
    Tmr_IdleTheTimer(&BattRegs.BattDisStartTimer);
    Tmr_IdleTheTimer(&BattRegs.BattDisconTestTimer);
}
void Batt_ePwm3_DutyTest (void)
{
    static int16    DutyCountsA = 0;
    static int16    DutyPercent = 0;
    if (Tmr_MSecondsTimeOut
            (&BattRegs.CheckTimer100ms))
    {
        if (DutyCountsA++ > PWM3_PERIOD)
            DutyCountsA = 0;
        EPwm3Regs.CMPA.half.CMPA = DutyCountsA;
        if (DutyPercent++ > 100)
            DutyPercent = 0;
        Batt_UpdateEPwm3bDutyCycle(DutyPercent);
    }
}
```

Way #2. Start/Restart at specific point, IDLE when time-out.
Step 1: Set the local timer to IDLE state.
Tmr_IdleTheTimer(&Local_Timer);
Step 2: Set/Reset the local timer at each time.

```
If (Tmr_IsIdle(&Local_Timer)
{
    Tmr_SetTimeOutMSeconds(&Local_Timer);
    ...
}
```

Step 3: When time-out, set the timer to IDLE condition.

```
else if (Tmr_MSecondsTimeOut(&Local_Timer))
{
    ...
    Tmr_IdleTheTimer(&BattRegs.LowBattTimer);
}
```

Step 4: Go to step 2.
Because the timer needs to be initialized every time, it takes more instructions; however, this approach provides a more precise timing control.

Example of using Way #2:

```
In function void Batt_LocalTimerInit ( void )
...
Tmr_IdleTheTimer(&BattRegs.LowBattTimer);
...
In function void CheckLowBattery ( void )
...
batteryVoltage = Adc_ReadAvg(ADC_BATT_VOLT_IDX,
                             SIGNAL_TYPE_DC);
if ( batteryVoltage < LOW_BATTERY_VOLTAGE) {
    // Start One Second Timer,
    // Upon Timeout Set Low Batt Flag
    if (Tmr_IsIdle(&BattRegs.LowBattTimer)) {
        Tmr_SetTimeOutMSeconds
            (&BattRegs.LowBattTimer,
            ONE_SECOND_MS_CNTS);
    }
    else if (Tmr_MSecondsTimeOut
            (&BattRegs.LowBattTimer)) {
        State.TransitionVariables1.
            bit.LowBatteryShutdown = TRUE;
        UI.Alarm.bit.LowBattery = TRUE;
    }
}
```

```
else    {
    State.TransitionVariables1.
            bit.LowBatteryShutdown = FALSE;
    Tmr_IdleTheTimer(&BattRegs.LowBattTimer);
}
```

EXAMPLE 3

Function Calling Technique

```
Tmr_MSecondsTimeOut(&ButtonRegs.CheckTimerHalf);
if (Tmr_IsTimeOut(&ButtonRegs.CheckTimerHalf))
{
    // Sample button press analog channel
    bButtonPressed = ON_OFF_BUTTON_INPUT;
}
else
{
    bButtonPressed = 0;
}
```

Tmr_MSecondsTimeOut( ) returns the result of whether there is a time-out. Therefore, directly checking the returning value from Tmr_MSecondsTimeOut( ) call (shown as below) is sufficient.

Recommend Solution:

```
if (Tmr_MSecondsTimeOut
        (&ButtonRegs.CheckTimerHalf))
{
    // Sample button press analog channel
    bButtonPressed = ON_OFF_BUTTON_INPUT;
}
else
{
    bButtonPressed = 0;
}
```

Another example:
One possible way:

```
Tmr_MSecondsTimeOut(&BattRegs.CheckTimer100ms);
if (Tmr_IsTimeOut (&BattRegs.CheckTimer100ms))
{
    Tmr_ResetTimeOutFlag
        (&BattRegs.CheckTimer100ms);
    . . .
}
```

Second, but better, way:

```
if (Tmr_MSecondsTimeOut
        (&BattRegs.CheckTimer100ms))
{
    . . .
}
```

EXAMPLE 4

In Specific Conditions

In the following case, Fault.FaultValidTimer is checked in limited places. The time-out condition (in function EvalDC-BusFault( ) ) should be determined first, then only check TOFlag later (in function EvalOutputFault( ) ). This is sufficient to control timing; however, it is necessary to clear the flag after checking the flag and finding that time-out has occurred.

```
void EvalDCBusFault (void)
{
    Uint16    dcBusSample;
    // * Process DC Bus Fault 1 sec
    // after First time on Line
    if (ValTheBit(State.Current, BIT5))
    {
        if (Tmr_IsIdle(&Fault.FaultValidTimer))
        {
            Tmr_SetTimeOutSeconds(&Fault.FaultValidTimer,
                            ONE_SECOND);
        }
        else if (Tmr_SecondsTimeOut
                    (&Fault.FaultValidTimer))
        {
            dcBusSample = Adc_Read(ADC_DCBUS_VOLT_IDX,
                            SIGNAL_TYPE_DC);
            if (dcBusSample < DCBUS_FAULT_75V_CNTS)
            {
                if(!State.WarningFlags.bit.DCBusBadOnce)
                {
                    State.WarningFlags.bit.DCBusBadOnce = TRUE;
                }
                else
                {
                    State.FaultFlags.bit.DCBusUnderVoltage
                        = TRUE;
                    State.WarningFlags.bit.DCBusBadOnce
                        = FALSE;
                    UI.Alarm.bit.Overload = TRUE;
                    UpdateNewState(FAULT);
                }
            }
            else
            {
                State.WarningFlags.bit.DCBusBadOnce = FALSE;
                ...
            }
        }
    }
    else
    {
        Tmr_IdleTheTimer(&Fault.FaultValidTimer);
    }
}
void EvalOutputFault (void)
{
    if (ValTheBit(State.Current, BIT5))
    {
        // Check Fault.FaultValidTimer.Flag.bit.TOFlag
        if (Tmr_IsTimeOut(&Fault.FaultValidTimer))
        {
            Tmr_ResetTimeOutFlag(&Fault.FaultValidTimer);
            if (RMS_Array[ADC_OUTPUT_VOLT_IDX].CurrRMSValue
                            < OUTPUT_FAULT_50V_CNTS)
            {
                if (!State.WarningFlags.bit.OutputBadOnce)
                {
                    State.WarningFlags.bit.OutputBadOnce
                        = TRUE;
                }
                else
                {
                    State.FaultFlags.bit.OutputVoltage
                        = TRUE;
                    State.WarningFlags.bit.OutputBadOnce
                        = FALSE;
                    UI.Alarm.bit.ShortCircuit = TRUE;
                    UpdateNewState(FAULT);
                }
            }
        }
    }
}
```

```
        else
        {
            State.WarningFlags.bit.OutputBadOnce
                = FALSE;
        }
      }
    }
  }
}
```

EXAMPLE 5

Timing Control Beepers

Approach without ping-pong timers:

```
// this is shadow of 1 Sec abs timer
if (OneSecAbsTimer != SysTime.Sec)
{
    OneSecAbsTimer = SysTime.Sec;
    RelaceBatteryTimer++;     // counts every second
}
// beep for the first 60 seconds (1 minute)
if (RelaceBatteryTimer < 60)
{
    if ((UI.BeeperState > 0)&&(UI.BeeperState < 3))
    {
        UI.ControlReg.bit.AudibleAlarm = TRUE;
    }
    else if (UI.BeeperState > 5)
    {
        UI.BeeperState = 0;
    }
}
// 5 hours have passed, reset time
// to beep for 1 minute again
if (RelaceBatteryTimer > 18000)
{
    RelaceBatteryTimer = 0;
}
```

Approach using Ping-Pong Timing Control System:

```
if (Tmr_IsIdle(&UI.BatteryReplaceTimer))
{
    Tmr_SetTimeOutMinutes
        (&UI.BatteryReplaceTimer, ONE_MINUTE);
}
else if (Tmr_MinutesTimeOut
        (&UI.BatteryReplaceTimer))
{
    if (UI.BatteryReplaceTimer.Interval ==
            ONE_MINUTE)
    {
        Tmr_SetTimeOutMinutes
            (&UI.BatteryReplaceTimer, FIVE_HOURS);
    }
    else
    {
        // 5 hours have passed, reset time to beep
        // for 1 minute again
        Tmr_IdleTheTimer(&UI.BatteryReplaceTimer);
    }
}
else if (UI.BatteryReplaceTimer.Interval ==
        ONE_MINUTE)
{
    // beep for the first 60 seconds (1 minute)
    if ((UI.BeeperState > 0)&&(UI.BeeperState < 3))
    {
        UI.ControlReg.bit.AudibleAlarm = TRUE;
    }
```

```
    else if (UI.BeeperState > 5)
    {
        UI.BeeperState = 0;
    }
}
```

EXAMPLE 6

Using One Time-Checker For Different Intervals

One time-checker may be used to track different time intervals at different levels of time granularity, depending in the state of the system that is using the time checker. For example, a time checker may be used, at first, to monitor a system's battery power level every 5 hours. If the battery is determined to be below a certain threshold level, the time checker may then be used to monitor the battery every 20 minutes. The following code illustrates another example.

```
CHECK_TIMER *pCheck;
if (Tmr_TimeOut
        (pCheck, (Uint16)pCheck->Flag.bit.TmrIdx))
{
    if (!BattRegs.BattFlags.
            bit.BattPresentTestInProg)
    {
        // Set bit if failed self test results are
        // valid
            ... ...
        // every 5 seconds, start the battery
        // disconnect test
            ... ...
        // set time for the test to 60 ms
        pCheck->Flag.bit.TmrIdx = MSECONDS_LOC;
        Tmr_SetTimeOut
            (pCheck, SIXTY_M_SECONDS, MSECONDS_LOC);
    }
    else
    {
        // When on-line, Every 5 seconds when at
        // float voltage, do battery disconnected
        // test at "start" time
            ... ...
        // set next time to do this disconnect test
        pCheck->Flag.bit.TmrIdx = SECONDS_LOC;
        Tmr_SetTimeOut
            (pCheck, FIVE_SECONDS, SECONDS_LOC);
    }
}
```

Advantages of using the Ping-Pong Timing Control System include (1) avoiding directly calling system timers, (2) consuming less processing instructions, resulting in better organized and more efficient functioning, and (3) a different "Interval" can be applied on the same local timer freely during the process.

FIGS. 6A-C illustrate, at three different points in time, example values of the variables that may be used to implement the example ping-pong timer systems described above. FIG. 6A illustrates three "seconds" time-checkers; a 34-second, 1-second, and 76-second time checker, which run concurrently. The "pTimer" value indicates the timer (ping timer or pong timer) to which the time checker is currently pointing. All three time checkers in FIG. 6A are pointing to the pong timer (0x000088DD). FIG. 6B also illustrates three time checkers. The "TransitionChecker" illustrates a time checker that has already timed-out and that is left "free-running" until the next time it is reset, that is, it will not be checked again until the next time it is reset. The "NineMinsChecker" is a nine-minute time checker and the "TenSecsChecker" is a ten-second time checker. All three time checkers are pointing to the ping timer (0x000088D9). FIG. 6C illustrates a point in time when the "NineMinsChecker" and the "TenSecsChecker" have timed-out at least once, have crossed the halfway point with respect to the ping timer, as described above, and are, as a result, now pointing to the pong timer (0x000088DD). As illustrated, the "TransitionChecker" is still free-running and pointing to the ping timer.

Figure 7:
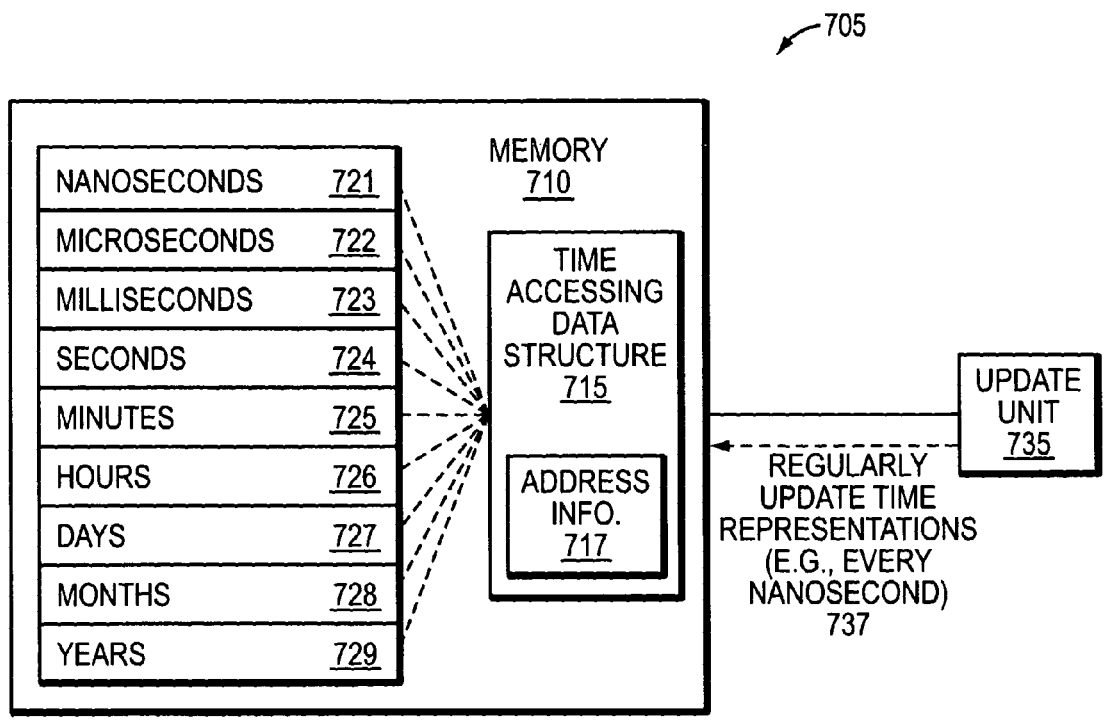
FIG. 7 is a block diagram illustrating a system for providing a timer.

FIG. 7 is a block diagram illustrating a system 705 for providing a timer, according to an embodiment of the present invention. The system 705 includes multiple processor-level memory locations 721-729, which store a representations of time at a lowest level of time granularity (e.g., nanoseconds 721) and multiple other representations of time at respectively higher levels of time granularity 722-729. The system 705 also includes an update unit 735 that updates the representations of time 721-729 on a regular basis 737. It should be understood that the representations 721-729 are updated at least as often as the lowest level of time granularity 721. The system 705 further includes a data structure 715 that includes address information 717 for the memory locations 721-729 and that enables access to the representations of time 721-729. As illustrated, the levels of time granularity may include levels that relate to calendar units (e.g., days 727, months 728, and years 729).

While this invention has been particularly shown and described with references to example embodiments thereof, it will be understood by those skilled in the art that various changes in form and details may be made therein without departing from the scope of the invention encompassed by the appended claims.

It should be understood that the diagrams of FIGS. 4 and 5 are examples that can include more or fewer components, be partitioned into subunits, or be implemented in different combinations. Moreover, the flow diagram of FIG. 5 may be implemented in hardware, firmware, or software. If implemented in software, the software may be written in any software language suitable for use in the example computer architecture illustrated in FIG. 2. Although examples of computer code have been provided that are written in the C programming language, any appropriate programming language may be used. The software may be embodied on any form of computer readable medium, such as RAM, ROM, or magnetic or optical disk, and loaded and executed by generic or custom processor(s).

Figure 8:
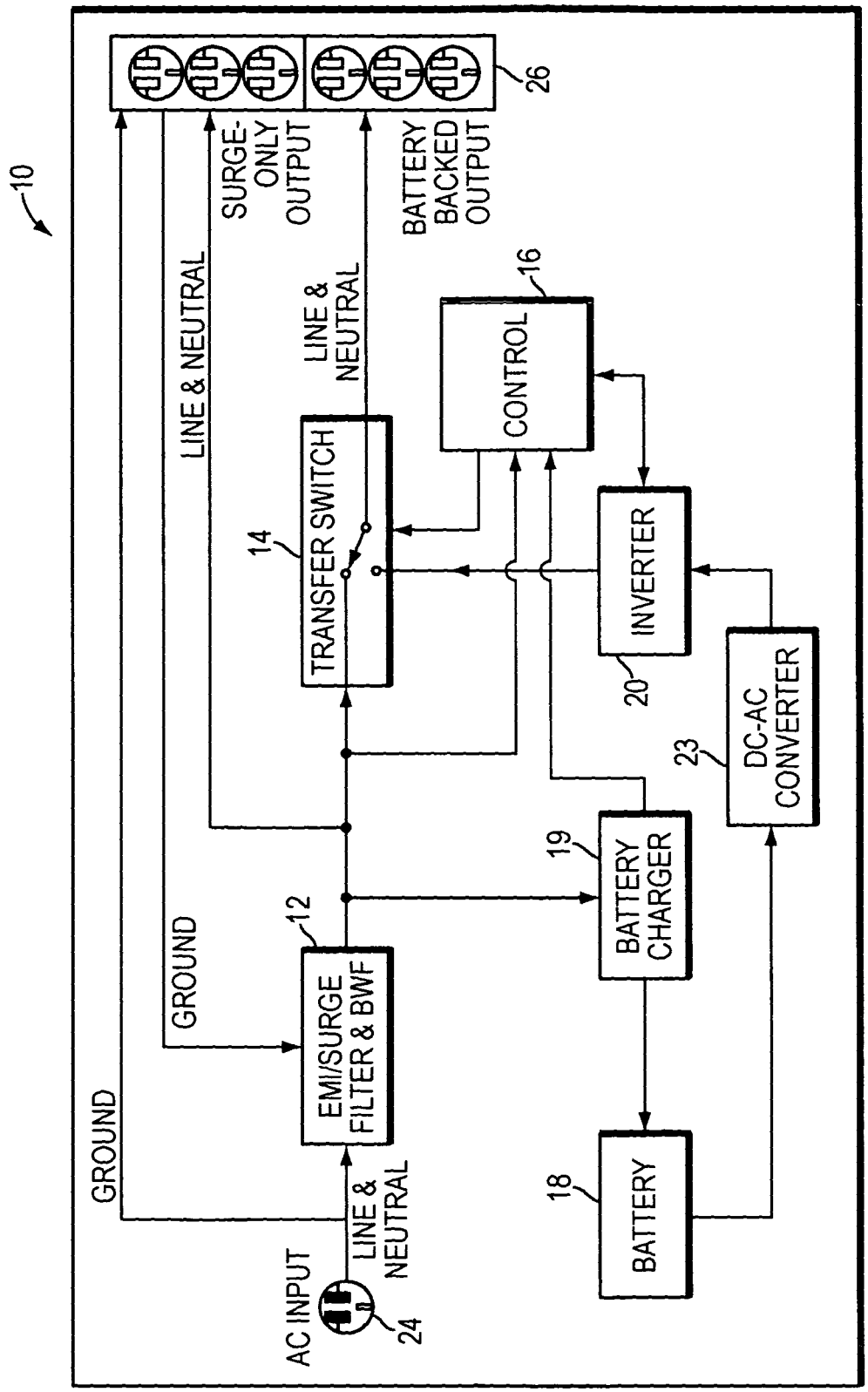
FIG. 8 is a block diagram illustrating a typical UPS system.

The disclosed embodiments can be applied to any UPS topology, such as off-line, line interactive, or double conversion. An example UPS topology is illustrated in FIG. 8. The UPS 10 includes an input filter/surge protector 12, a transfer switch 14, a controller 16, a battery 18, a battery charger 19, an inverter 20, and a DC-AC converter 23. The UPS also includes an input 24 for coupling to an AC power source and an outlet 26 for coupling to a load. The UPS 10 operates as follows. The filter/surge protector 12 receives input AC power from the AC power source through the input 24, filters the input AC power and provides filtered AC power to the transfer switch and the battery charger. The transfer switch 14 receives the AC power from the filter/surge protector 12 and also receives AC power from the inverter 20. The controller 16 determines whether the AC power available from the filter/surge protector is within predetermined tolerances, and if so, controls the transfer switch to provide the AC power from the filter/surge protector to the outlet 26. If the AC power from the rectifier is not within the predetermined tolerances, which may occur because of "brown out," "high line," or "black out" conditions, or due to power surges, then the controller controls the transfer switch to provide the AC power from the inverter 20. The DC-AC converter 23 is an optional component that converts the output of the battery to a voltage that is compatible with the inverter. Depending on the particular inverter and battery used, the inverter may be operatively coupled to the battery either directly or through a converter.

The example timers presented herein are illustrated with respect to such a UPS application, but it should be understood that the timers can be applied to any device using timers with multiple timing intervals, such as, for example, general purpose computers, handheld devices with processors using real-time or pseudo-real-time processors, clocks, watches, or other electrical devices employing timers. Further, the example timers presented herein are described using two (i.e., ping and pong).timers. In other embodiments, more than two timers can be used (e.g., three timers) and applied in a manner similar to the two-timer examples presented herein.

What is claimed is:

1. A system for providing timing, the system comprising:
 a processing device including:
  a memory;
  a ping timer;
  a pong timer, a value of the pong timer being offset from a value of the ping timer in the memory; and
  a control unit coupled to the memory via a processor bus and configured to execute instructions that implement a time checker, the time checker being a logical timer that accesses the ping timer via the processor bus to determine whether a time interval has passed and, upon determining that the time interval has passed, the time checker switches access from the ping timer to the pong timer before the value of the ping timer reaches an overflow state due to a limited number of bits in the memory allocated to storage thereof.

2. A system as in claim 1 wherein values of the ping timer and the pong timer increase linearly at a same rate of increase.

3. A system as in claim 1 wherein the ping timer and the pong timer (i) each reach a maximum value before respectively reaching the overflow state, (ii) each reset to a minimum value upon respectively reaching the overflow state, and (iii) are offset from each other by one half of the maximum value.

4. A system as in claim 3 wherein the time checker switches access to the pong timer upon determining that the time interval has passed and in an event the value of the ping timer exceeds one half of the maximum value.

5. A system as in claim 1 wherein the ping timer and the pong timer each include multiple representations of time at multiple levels of time granularity.

6. A system as in claim 5 wherein the multiple representations of time are updated during an interrupt service routine, the interrupt service routine being a callback subroutine in an operating system or device driver executed based on an interrupt allowed by the control unit.

7. A system as in claim 1 wherein the time checker accesses the timers using a pointer to the memory.

8. A system as in claim 1 wherein the control unit is further configured to simultaneously update the ping timer and the pong timer.

9. A system as in claim 1 wherein the time checker further switches access from the pong timer back to the ping timer before the pong timer reaches the overflow state.

10. A system as in claim 1 wherein the processing device further includes:
 a plurality of time checkers that independently access the ping and pong timers to determine whether time intervals have passed.

11. A system as in claim 1 wherein the processing device further includes:
at least one additional timer, each respective value of the at least one additional timer being offset from the values of the ping timer, the pong timer, and any other of the at least one additional timer; and
wherein the time checker rotates through all of the timers by further (i) switching access from the pong timer to a first timer of the at least one additional timer before the pong timer reaches the overflow state and (ii) switching access from a last timer of the at least one additional timer back to the ping timer before the last timer reaches the overflow state.

12. A system as in claim 1 wherein, in an event the time checker determines that the time interval has passed, the control unit is further configured to execute instructions to perform a subsequent action based on the determination.

13. A method of providing timing, the method comprising:
by a processor, updating a ping time and a pong time in a memory, the pong time being offset from the ping time;
by the processor, accessing the ping time in the memory to determine whether a time interval has passed; and
upon determining that the time interval has passed, the processor switching access from the ping time to the pong time before the ping time reaches an overflow state due to a limited number of bits in the memory allocated to storage thereof.

14. A method as in claim 13 wherein updating the ping time and the pong time includes (i) updating the ping time with a maximum value before the ping time overflows and, upon the ping time overflowing, resetting the ping time with a minimum value and (ii) updating the pong time with a maximum value before the pong time overflows and, upon the pong time overflowing, resetting the pong time with a minimum value; and
wherein the ping time and the pong time are offset from each other by one half of the maximum value.

15. A method as in claim 14 wherein switching access to the pong time includes switching access to the pong time upon determining that the time interval has passed and in an event the ping time exceeds one half of the maximum value.

16. A method as in claim 13 wherein updating the ping time and the pong time includes updating multiple representations of time at multiple levels of time granularity.

17. A method as in claim 16 further comprising:
updating the multiple representations of time during an interrupt service routine, the interrupt service routine being a callback subroutine in an operating system or device driver executed based on an interrupt allowed by the processor.

18. A method as in claim 13 wherein accessing the ping time includes accessing the ping time using a pointer that points to a first memory location storing the ping time, and wherein switching access to the pong time includes pointing the pointer to a second memory location storing the pong time.

19. A method as in claim 13 further including:
switching access from the pong time back to the ping time before the pong time overflows.

20. A method as in claim 13 further comprising:
updating at least one additional time, each of the at least one additional time being offset from the ping time, the pong time, and any other of the at least one additional time; and
wherein switching access includes rotating through all of the times by further (i) switching access from the pong time to a first time of the at least one additional time before the pong time overflows and (ii) switching access from a last time of the at least one additional time back to the ping time before the last time overflows.

21. A method as in claim 13 further comprising:
enabling a module to access the ping time and the pong time to determine whether the time interval has passed, the module subsequently performing an action based on the determination.

22. A computer readable medium having computer readable program codes embodied therein for providing timing, the computer readable program codes including instructions that, when executed by a processor, cause the processor to:
allocate memory for a ping timer in a memory;
allocate memory for a pong timer in the memory, a value of the pong timer being offset from a value of the ping timer;
access the ping timer to determine whether a time interval has passed; and
upon determining that the time interval has passed, switch access from the ping timer to the pong timer before the ping timer reaches an overflow state due to a limited number of bits in the memory allocated to storage thereof.

23. A system for providing a timer, the system comprising:
multiple processor-level memory locations in a memory storing a representation of time at a lowest level of time granularity and multiple other representations of time at respectively higher levels of time granularity for representing a value of a ping timer and a value of a pong timer, the value of the pong timer represented being offset from the value of the ping timer represented;
an update unit configured to update the stored representations of time on a regular basis at least as often as the lowest level of time granularity via address information;
a data structure enabling access to the stored representations of time, the data structure including the address information for the multiple processor-level memory locations; and
a timer checker, the time checker being a logical timer configured to access the ping and pong timers via the address information to determine whether a time interval has passed, and upon determining that the time interval has passed, switch access from the ping timer to the pong timer before the value of the ping timer represented reaches an overflow state due to a limited number of bits in the memory allocated to storage thereof.

24. A system as in claim 23 wherein the multiple other representations of time at respectively higher levels of time granularity include levels of time granularity relating to calendar units.

25. A method of providing a timer, the method comprising:
allocating multiple processor-level memory locations in a memory to store a representation of time at a lowest level of time granularity and multiple other representations of time at respectively higher levels of time granularity for representing a value of a ping timer and a value of pong timer, the value of the pong timer represented being offset from the value of the ping timer represented;
updating the stored representations of time on a regular basis at least as often as the lowest level of time granularity via address information;
to accessing the stored representations of time through a data structure including the address information for the multiple processor-level memory locations to determine whether a time interval has passed; and
upon determining that the time interval has passed, switching access from the ping timer to the pong timer before the value of the ping timer represented reaches an overflow state due to a limited number of bits in the memory allocated to storage thereof.

26. A method as in claim 25 wherein the multiple other representations of time at respectively higher levels of time granularity include levels of time granularity relating to calendar units.

27. An uninterruptible power supply system, comprising:
a battery;
a processing device including:
  a memory;
  a ping timer;
  a pong timer, a value of the pong timer being offset from a value of the ping timer in the memory;
  a control unit coupled to the memory via a processor bus and configured to execute instructions that implement a time checker, the time checker being a logical timer that accesses the ping timer via the processor bus to determine whether a time interval has passed and, upon determining that the time interval has passed, the time checker switches access from the ping timer to the pong timer before the ping timer reaches an overflow state due to a limited number of bits in the memory allocated to storage thereof; and
  a charging module configured to store power in the battery from a power source by monitoring power in the battery in an event the time interval has passed, as determined by the time checker.

* * * * *